(12) United States Patent
Tamura et al.

(10) Patent No.: US 7,188,257 B2
(45) Date of Patent: Mar. 6, 2007

(54) FALSIFICATION DETECTION SYSTEM, AND FALSIFICATION DETECTION METHOD AND MEDIUM

(75) Inventors: Naohiro Tamura, Kawasaki (JP); Koji Ishibashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 718 days.

(21) Appl. No.: 10/097,930

(22) Filed: Mar. 15, 2002

(65) Prior Publication Data

US 2003/0084299 A1 May 1, 2003

(30) Foreign Application Priority Data

Nov. 1, 2001 (JP) ............................. 2001-336508

(51) Int. Cl.
| | |
|---|---|
| G06F 11/30 | (2006.01) |
| G06F 12/14 | (2006.01) |
| H04L 9/32 | (2006.01) |
| H04L 9/00 | (2006.01) |
| G06F 15/16 | (2006.01) |

(52) U.S. Cl. ...................... 713/193; 713/176; 713/181; 713/187; 709/218; 709/246
(58) Field of Classification Search ................ 713/200, 713/193, 176; 709/218, 246
See application file for complete search history.

(56) References Cited

U.S. PATENT DOCUMENTS

| | | | |
|---|---|---|---|
| 6,286,001 B1 * | 9/2001 | Walker et al. ................. 707/9 |
| 6,357,004 B1 * | 3/2002 | Davis ......................... 713/100 |
| 6,629,198 B2 * | 9/2003 | Howard et al. ............. 711/112 |
| 6,748,538 B1 * | 6/2004 | Chan et al. .................. 713/200 |
| 2001/0044820 A1 * | 11/2001 | Scott .......................... 709/202 |
| 2002/0013825 A1 * | 1/2002 | Freivald et al. ............. 709/218 |
| 2002/0038429 A1 * | 3/2002 | Smeets ....................... 713/193 |
| 2003/0061487 A1 * | 3/2003 | Angelo et al. ............. 713/176 |

* cited by examiner

*Primary Examiner*—Ayaz Sheikh
*Assistant Examiner*—Shin-Hon Chen
(74) *Attorney, Agent, or Firm*—Staas & Halsey LLP

(57) ABSTRACT

Disclosed is a system for detecting falsification, the system having: a confirmation information preparing unit preparing confirmation information of source data of published content published on the Internet; a confirmation information holding unit holding the confirmation information of the source data at a predetermined point in time; a source data alteration detecting unit detecting an alteration in the source data; a reflecting unit reflecting the altered source data in the confirmation information of the confirmation information holding unit and in the published content; a published content alteration detecting unit performing alteration detection on the published content; a published content alteration notifying unit notifying a predetermined terminal of information relating to altered published content; and a controlling unit controlling detection of inappropriately altered published content, based on the confirmation information of the source data and on the confirmation information of the published content.

18 Claims, 15 Drawing Sheets

FALSIFICATION DETECTION SYSTEM, AND FALSIFICATION DETECTION METHOD AND MEDIUM

BACKGROUND OF THE INVENTION

1. Field of the Invention

The present invention relates to a technology for detecting falsification of content on a web site published in an Internet environment, for example.

2. Description of the Related Art

Up to now, known methods for detecting falsification of a computer file include a technology using a message digest. According to this technology, a program mounted with a message digest algorithm generates a message digest (hash code) of the file to be searched to detect the falsification, and this is saved. Then, generally, after a given duration of time has elapsed, in order to detect whether the file has been falsified or not, another message digest of the file is generated and this is compared with the saved message digest.

Then, as a result of the comparison, if the two message digests match, it is determined that the file has not been altered and has not been falsified. Further, in the case where the two message digests do not match, it is determined that the file has been altered.

However, the conventional falsification detection system was not able to judge whether the alteration was an appropriate alteration or an inappropriate alteration (falsification). In other words, the conventional falsification detection system was, more accurately, an alteration detection system. Therefore, after the alteration was detected, it was necessary for a user to investigate the alteration and to judge whether the alteration was a falsification or not.

FIG. 1 is a block diagram showing a configuration of the conventional falsification detection system. The falsification detection system shown in the diagram includes the subject content to the falsification detection, and an MD DB (message digest database) storing a message digest generated at a given time.

The falsification detection in the system is performed according to the following three steps:
1. The message digest is prepared from the subject content to be stored in the MD DB.
2. The message digest from the subject content is compared with the message digest in the MD DB and an alteration in the subject content is detected.
3. The result produced by the alteration detection is confirmed by a human and judged as to whether it is an inappropriate alteration or an appropriate alteration.

Known examples of the system described above include Tripwire by Tripwire, Inc. (http://www.tripwire.com), Intact by Pedestal Software, Inc. (http://www.pedestalsoftware.com), and Dragon Squire by Enterasys Networks, Inc. (http://www.enterasys.com).

However, in the conventional technology described above, the results of the falsification detection are produced without distinguishing between appropriate and inappropriate alterations. As a result, the following problems occur:
(1) The investigation must be made in order to distinguish the appropriate alteration from the inappropriate alteration in the results produced by the falsification detection.
(2) The appropriate alteration is detected as the falsification.
(3) Since many appropriate alterations are reported among the falsification detection results, the inappropriate alteration that is actually supposed to be detected is easy to be overlooked.

SUMMARY OF THE INVENTION

The present invention has been made in light of the problems inherent in the conventional technology as described above. An object of the present invention is therefore to provide a technology being capable of clearly distinguishing between an appropriate alteration and an inappropriate alteration in published content and conducing highly precise falsification detection.

In order to achieve the above object, the present invention adopts the following measures.

That is to say, according to the present invention, there is provided a falsification detection system including:
- a confirmation information preparing unit preparing confirmation information of source data of published content published on the Internet;
- a confirmation information holding unit holding the confirmation information of the source data at a predetermined point in time;
- a source data alteration detecting unit detecting an alteration in the source data;
- a reflecting unit reflecting the altered source data in the confirmation information of the confirmation information holding unit and in the published content;
- a published content alteration detecting unit detecting alteration in the published content;
- a published content alteration notifying unit notifying a predetermined terminal of information relating to altered published content; and
- a controlling unit controlling detection of inappropriately altered published content, based on the confirmation information of the source data and on the confirmation information of the published content.

Here, the term "confirmation information" refers to information prepared to confirm the contents of the content and the content source data. The confirmation information is also called a message digest or a checksum, for example.

According to the present invention, 1) the content source data which is the falsification detection subject, 2) the confirmation information of the content source data, and 3) the published content are used. Further, published content that has been altered inappropriately is detected based on the confirmation information from the source data, which has little possibility of being falsified and is safe, and on the confirmation information of the published content.

Preferably, the controlling unit may obtain the confirmation information of the altered published content from the published content alteration detecting unit, and may detect the altered published content, excluding the published content of which the confirmation information matches any of the confirmation information held in the confirmation information holding unit.

As described above, even in the case where the confirmation information of the published content does not match the latest confirmation information of the source data, when it matches any of the confirmation information held in the confirmation information holding unit, the publishing of the latest source data is determined as being in an incomplete state, and it is determined that inappropriate alteration of the published content has not been performed. Therefore, it is possible to detect the inappropriate alteration, excluding the appropriate alteration.

Preferably, the controlling unit may detect the reflection of the content source data in the published content, and may reflect the confirmation information of the content source data in the confirmation information holding unit.

As described above, by detecting the reflection of the content source data in the published content, the inappropriate alteration of the published content can be monitored in synchronization with the publishing of the content source data.

Preferably, the confirmation information holding unit may hold history of the confirmation information of the source data.

Preferably, the published content subject to the falsification detection may be the published content on a web site on the Internet.

Preferably, the published content subject to the falsification detection may have a one vs. many operation configuration, in which the falsification detection is possible on a plurality of published content on a plurality of web sites from a single administration site.

Preferably, the system may include an active content generating program (CGI) as the published content subject to the falsification detection.

Preferably, the published content may be provided on a web site that supports FTP (File Transfer Protocol) and HTTP (HyperText Transfer Protocol). That is, in the system according to the present invention, if the web site supports the FTP and the HTTP, then the inappropriate alteration in the published content may be detected without restriction on the web site hardware type, the OS type and the web server type.

Further, the present invention may also be a method for realizing any of the above functions in a computer. Further, the present invention may be a program for realizing any of the above functions in a computer. Further, the present invention may be a computer readable storage medium with the above program recorded thereon.

As explained above, according to the present invention, 1) the content source data subject to the falsification detection, 2) the message digest of the content source data and 3) the published content are utilized, and only the inappropriate alteration, excluding the appropriate alteration, may be detected as the falsification. Thus, precision of the falsification detection may be significantly improved.

Further, according to the present invention, since the appropriate alteration is not included in the results of the falsification detection, a user (network administrator) does not need to perform an investigation to exclude the appropriate alteration from the falsification detection results.

Further, according to the present invention, since the appropriate alteration is not included in the results of the falsification detection, the user (network administrator) overlooks inappropriate alteration less.

As described above, according to the present invention, the appropriate alteration and the inappropriate alteration are clearly distinguished, enabling high precision falsification detection.

DETAILED DESCRIPTION OF THE PREFERRED EMBODIMENTS

Hereinafter, explanation will be made of preferred embodiments of the present invention with reference to the drawings.

<<First Embodiment>>

Hereinafter, an information processing system according to a first embodiment of the present invention is explained based on the drawings of FIG. 2 through FIG. 9.

Figure 1:
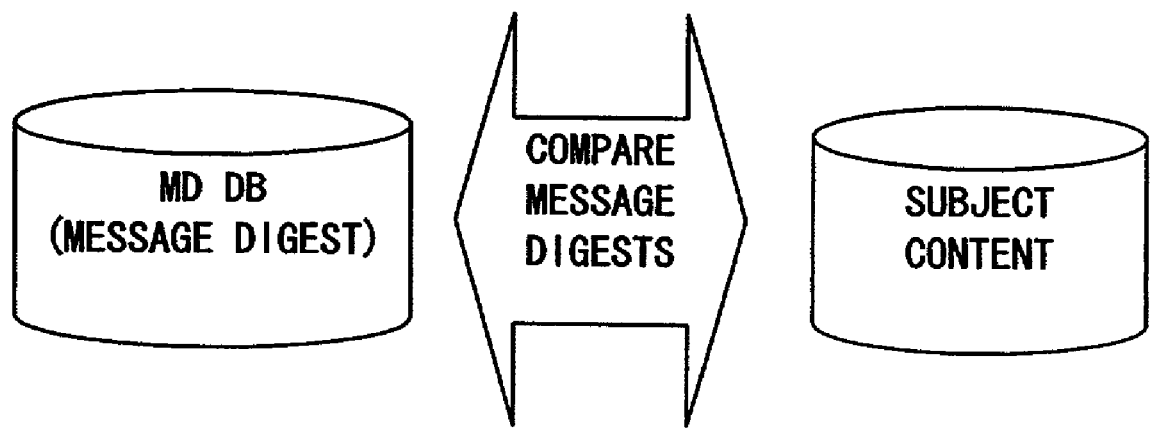
FIG. 1 is a diagram explaining an outline of a conventional falsification detection system.
Figure 2:
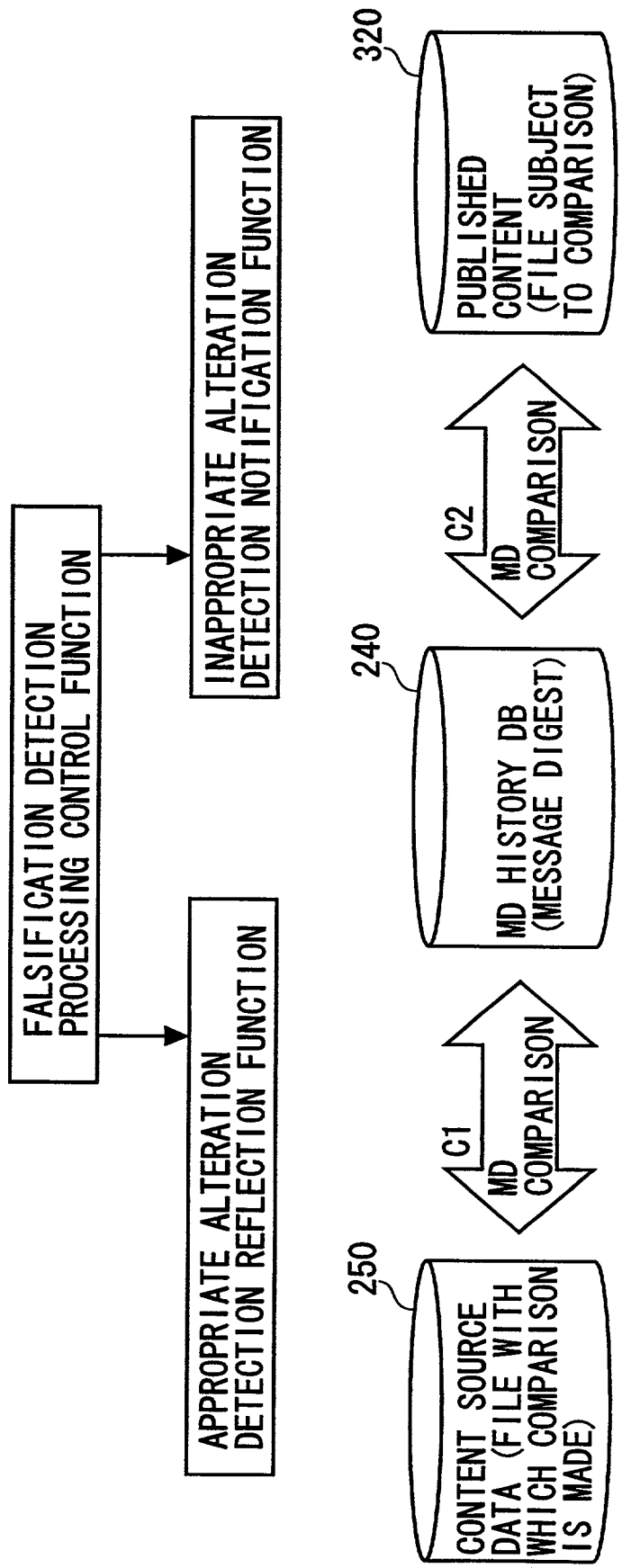
FIG. 2 is a diagram showing a principle of detection of falsification in published content.
Figure 3:
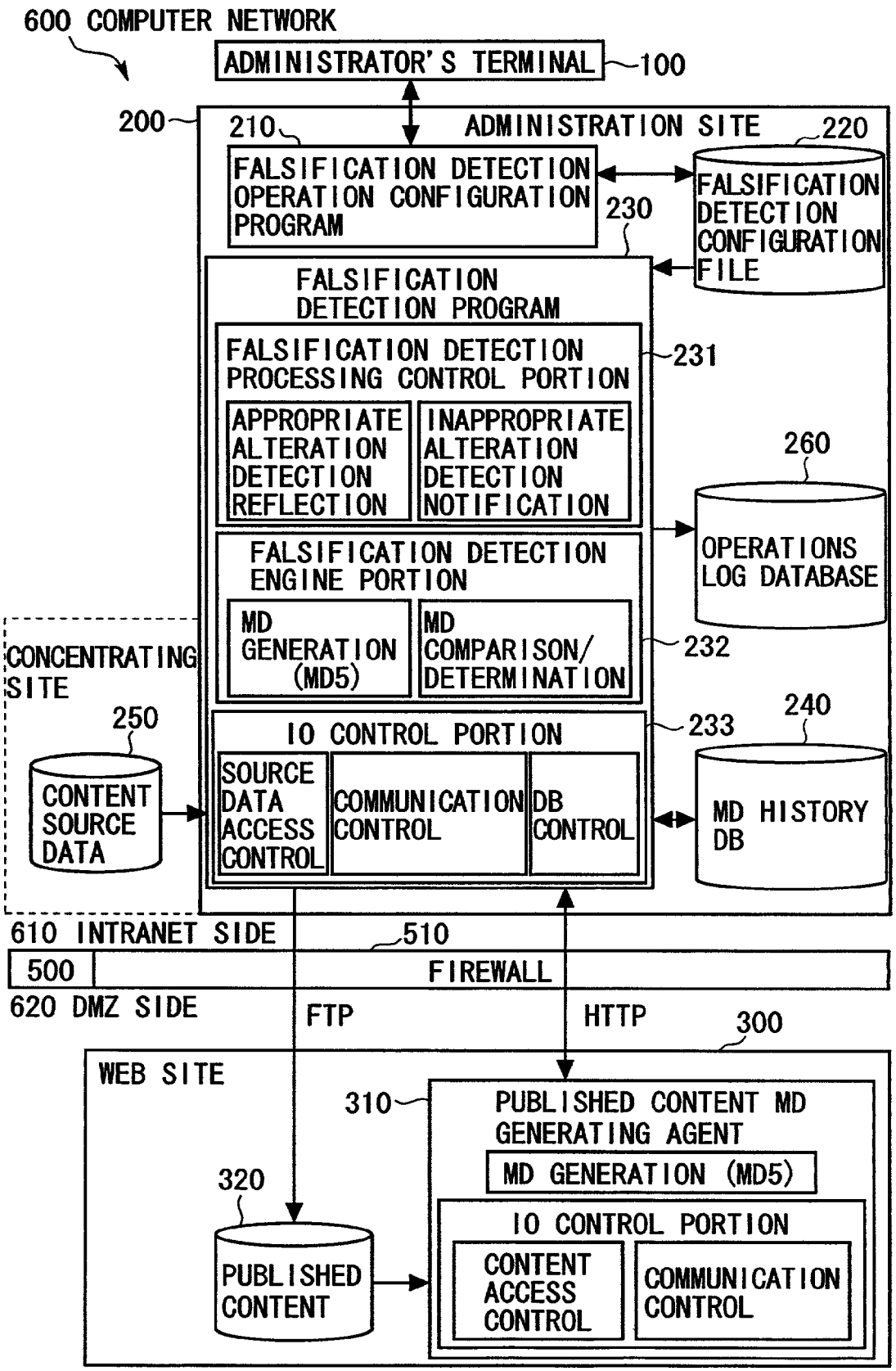
FIG. 3 is a functional block diagram showing an information processing system in accordance with a first embodiment.
Figure 4:
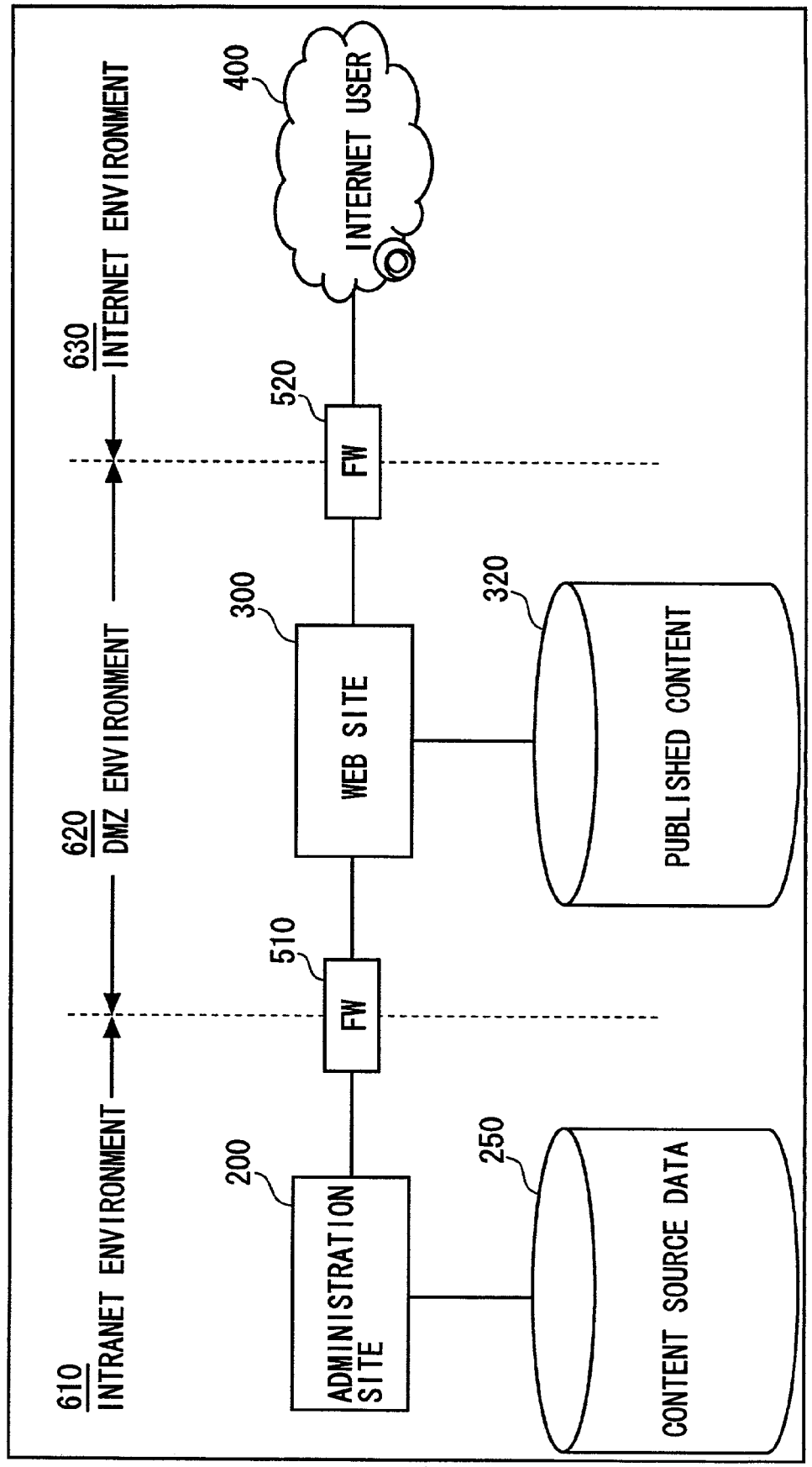
FIG. 4 is a network configuration diagram showing the information processing system in the first embodiment.
Figure 5:
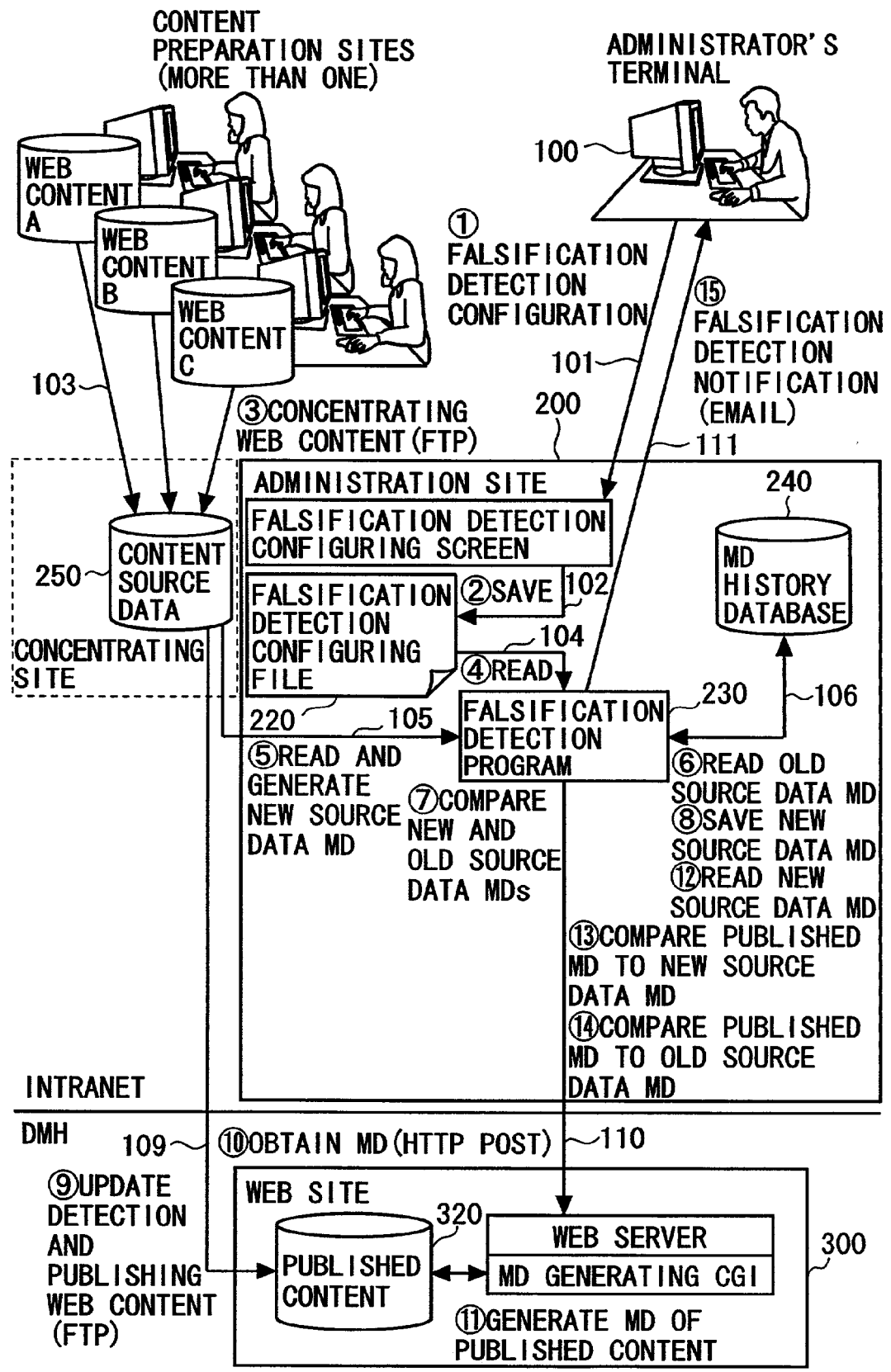
FIG. 5 is a diagram showing an operating configuration for the information processing system in accordance with the first embodiment.
Figure 6:
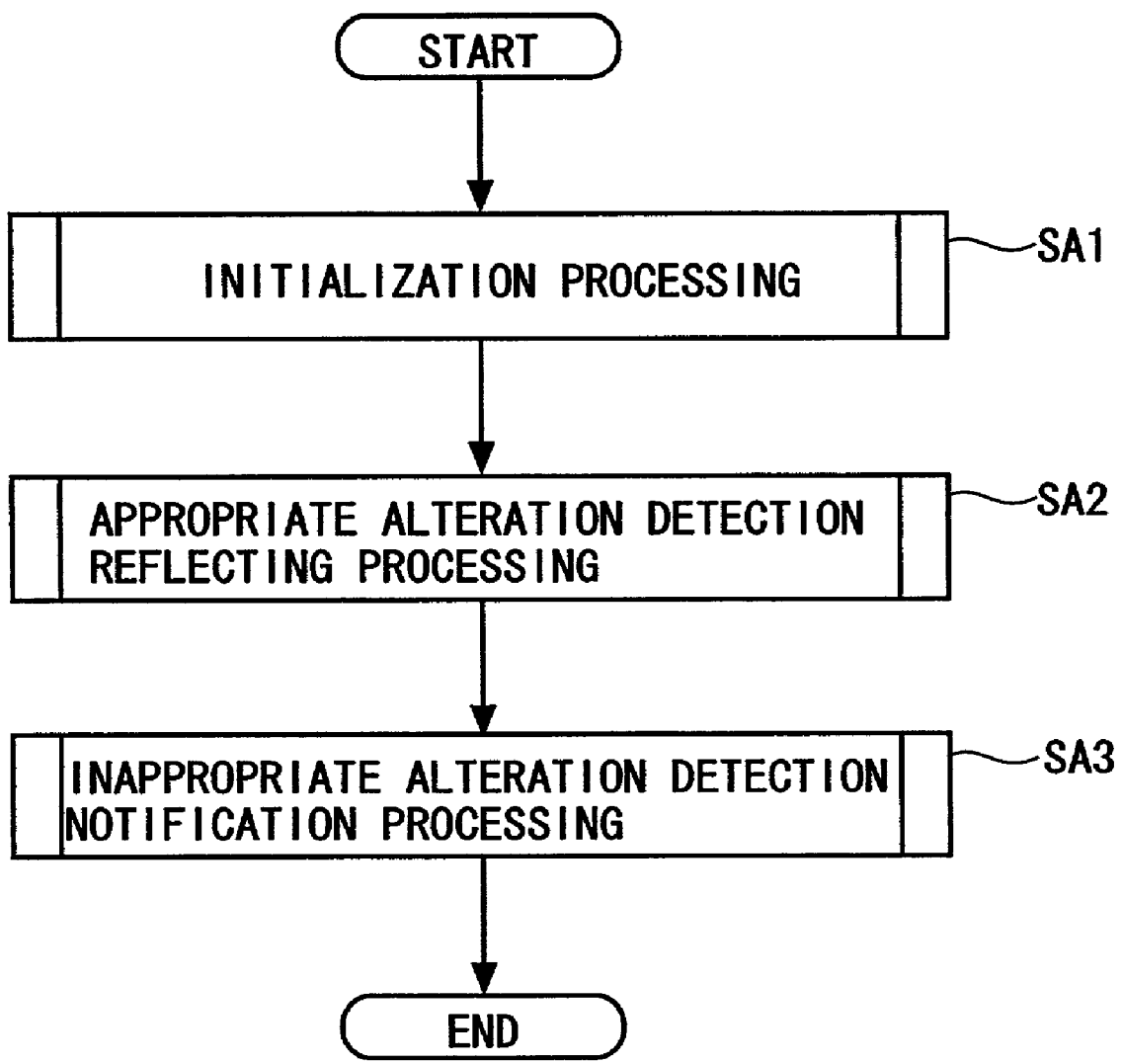
FIG. 6 is a flow chart showing a processing outline for a falsification detection program.
Figure 7:
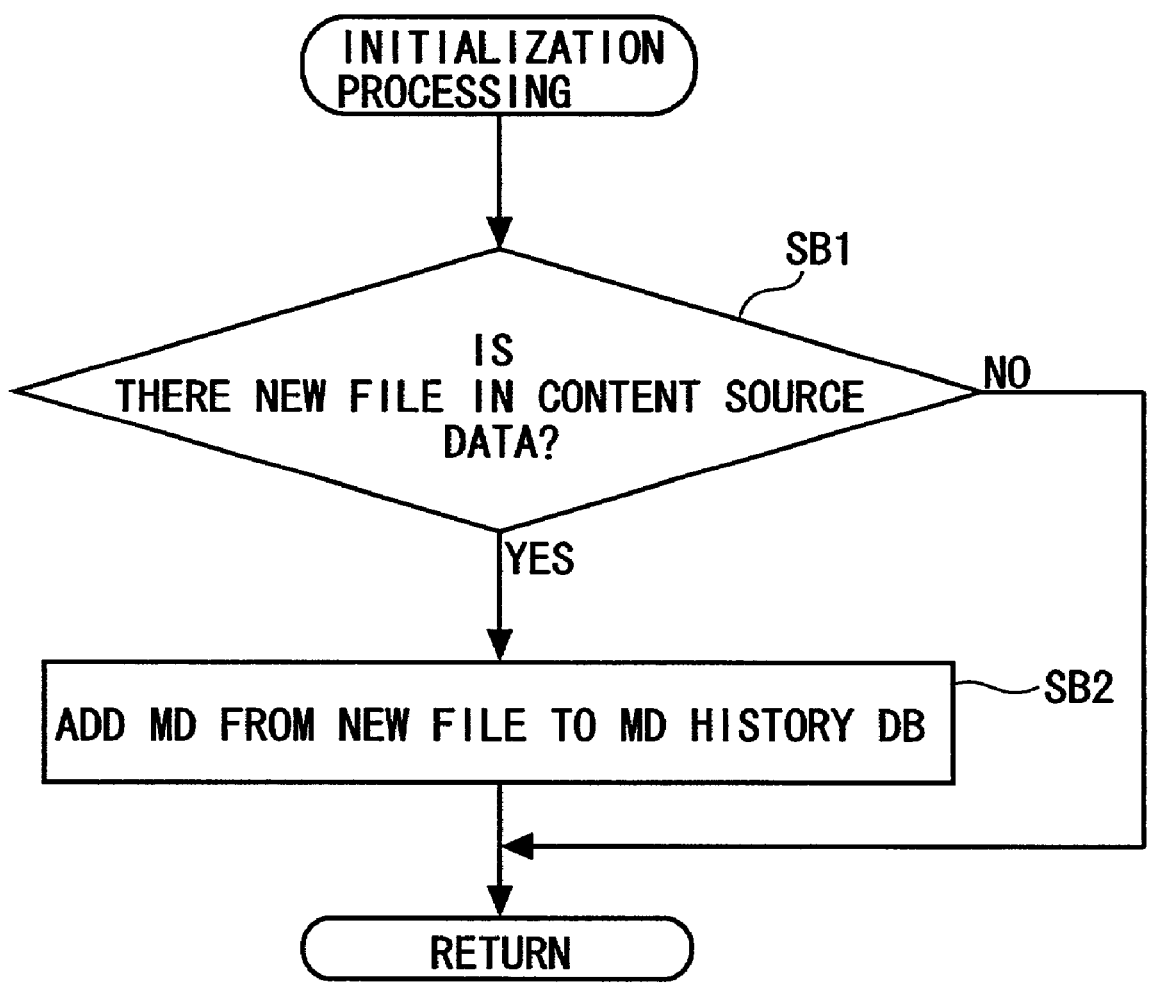
FIG. 7 is a flow chart showing details of initialization processing.
Figure 8:
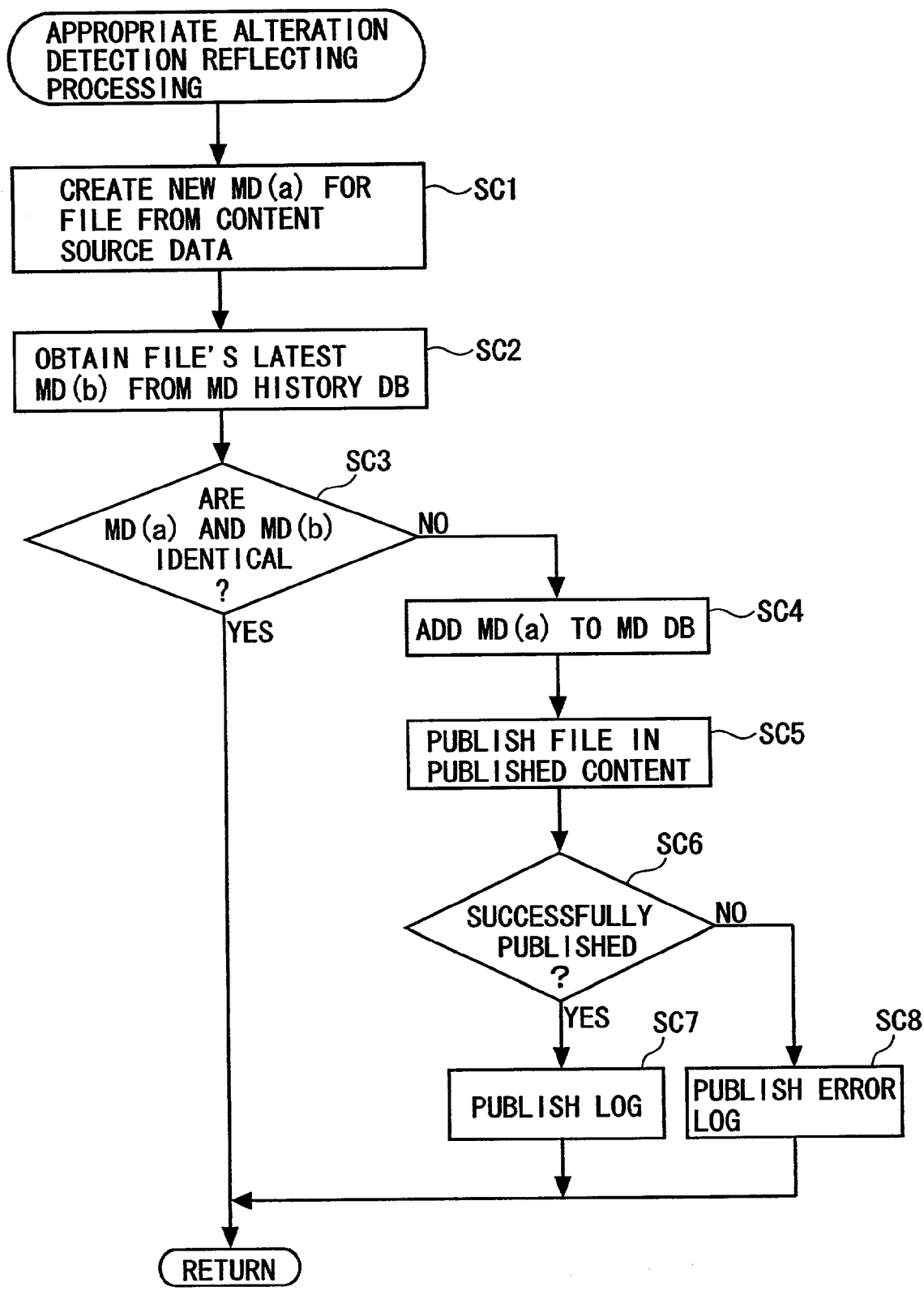
FIG. 8 is a flow chart showing details of an appropriate alteration detection reflecting processing.
Figure 9:
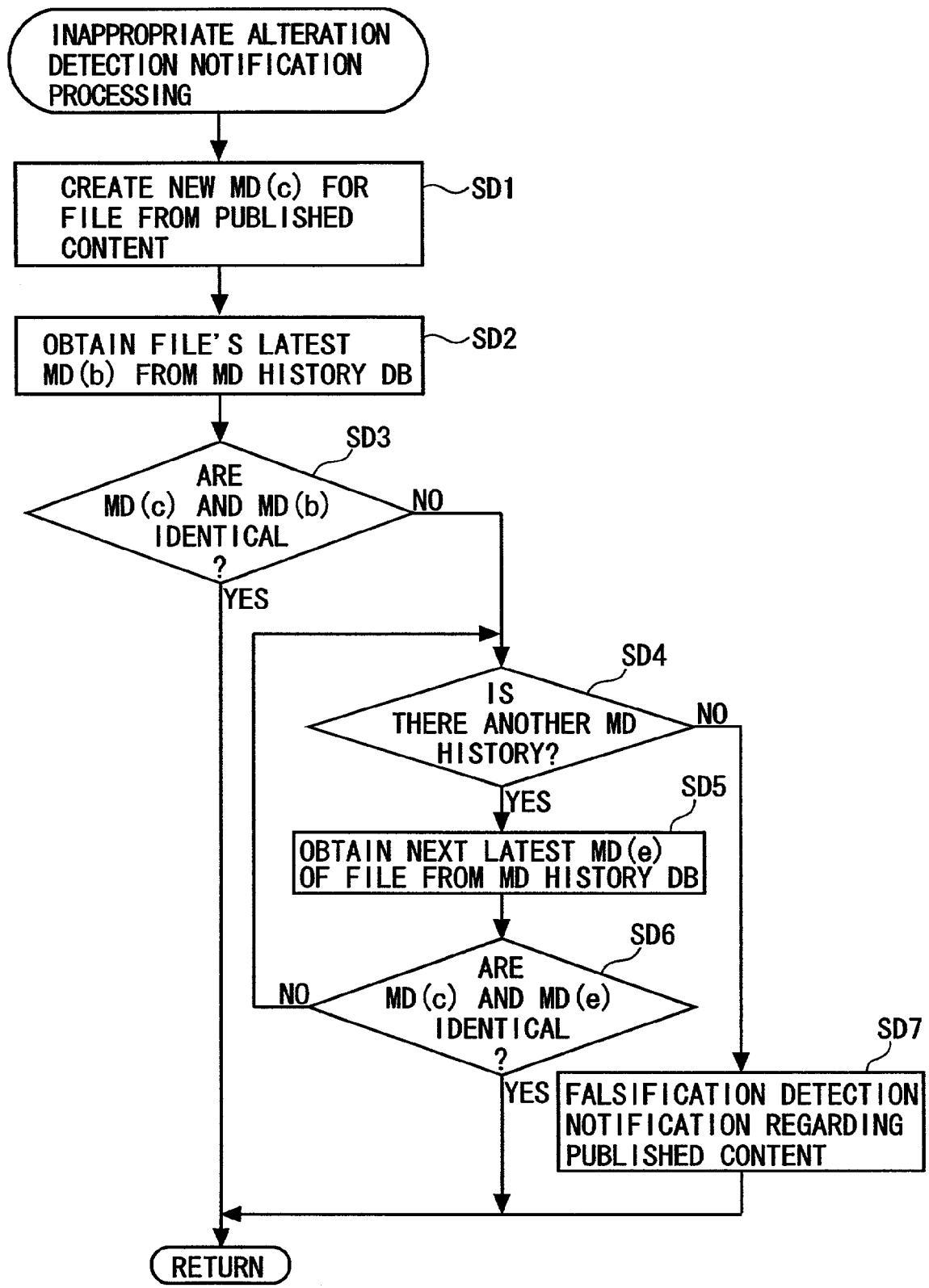
FIG. 9 is a flow chart showing details of an inappropriate alteration detection notification processing.

FIG. 2 is a diagram showing a principle of detection of falsification in published content in an information processing system of the present invention; FIG. 3 is a functional block diagram showing the information processing system; FIG. 4 is a network configuration diagram of the information processing system; FIG. 5 is a diagram showing an operating configuration for the information processing system; FIG. 6 is a flow chart showing a processing outline for a falsification detection program 230 shown in FIG. 3; FIG. 7 is a flow chart showing details of initialization processing (SA1) shown in FIG. 6; FIG. 8 is a flow chart showing details of an appropriate alteration detection reflecting processing (SA2) shown in FIG. 6; and FIG. 9 is a flow chart showing details of an inappropriate alteration detection notification processing (SA3) shown in FIG. 6.

<Principle of Falsification Detection>

FIG. 2 is a diagram showing a principle of detection of falsification in published content in the information processing system of the present invention. This information processing system has a function for detecting a falsification in published content of a web site. As shown in FIG. 2, this falsification detection function is composed of a falsification detection processing control function, an appropriate alteration detection reflection function and an inappropriate alteration detection notification function.

The falsification detection processing control function refers to a function for controlling execution of: the appropriate alteration detection reflecting processing which executes the appropriate alteration detection reflection function; and the inappropriate alteration detection notification processing which executes the inappropriate alteration detection notification function.

Here, the appropriate alteration detection reflection function refers to a function of detecting the appropriate alteration in a content source data 250 and reflecting the alteration in an MD (message digest) database 240 and in published content 320.

Here, the message digest refers to small-size data generated by digesting an inputted bit data string. The message digest is also referred to as a checksum.

The appropriate alteration detection reflection function prepares the message digest from the content source data 250 managed in a secure intranet, and compares the message digest with a message digest saved in the MD history database 240 (arrow C1).

Then, when the two message digests do not match each other, the appropriate alteration detection reflection function determines that the content source data 250 was altered. Accordingly, the appropriate alteration of the content source data 250 is detected.

Next, the appropriate alteration detection reflection function makes the appropriate alteration be reflected in the MD history database 240 and in the published content 320 on the Internet. That is, the appropriate alteration detection reflection function prepares the message digest from the altered content source data 250 and saves it in the MD history database 240. Further, the appropriate alteration detection reflection function also publishes the altered content source data 250 as the published content 320 on the Internet.

On the other hand, the inappropriate alteration detection notification function refers to a function for detecting the inappropriate alteration (falsification) in the published content 320 on the Internet and notifying a network administrator of the inappropriate alteration.

The inappropriate alteration detection notification function prepares the message digest from the published content 320 on the Internet and compares this message digest with the message digest saved in the MD history database 240 (arrow C2).

Then, when the two message digests do not match each other, the appropriate alteration detection notification function determines that the published content 320 was altered. Accordingly, the inappropriate alteration of the published content 320 is detected.

There are three cases in which alteration are detected in the comparison indicated by the arrow C2 in FIG. 2:

1. The case where the published content 320 was inappropriately altered (falsified).
2. The case where the content source data 250 was appropriately altered (updated), but for some reason the update was not reflected in the published content 320.
3. The case where the content source data 250 was appropriately altered (updated), but for some reason the update was not added to/reflected in the MD history database 240.

In the information processing system, the falsification detection processing control function sequentially executes control of the appropriate alteration detection reflection function and the inappropriate alteration detection notification function, whereby the inappropriate alteration (case 1) is distinguished from the appropriate alteration (case 2 and case 3) among the above three cases where alterations are detected. Thus, the information processing system detects the inappropriate alteration only without the appropriate alterations, and notifies the network administrator.

<System Configuration>

FIG. 3 is a functional block diagram showing the information processing system. The information processing system is built connecting an administration site 200, a web site 300 and an administrator's terminal 100 in a computer network 600.

The administrator's terminal 100 provides the network administrator with a user interface for the falsification detection. The administrator's terminal 100 is a computer having a CPU, a memory, a display, a communications interface and the like. The administrator's terminal 100 maybe, for example, a personal computer or a personal data assistant (PDA).

The administration site 200 is a computer for executing the falsification detection program 230 and a falsification detection operation configuration program 210. The administration site 200 has a CPU, a memory, a display, a communications interface and the like.

The administration site 200 is located on the intranet side of a firewall 510. Note that the administration site 200 may be composed of a single computer, or may also be composed of a plurality of computers connected with each other through the intranet.

The falsification detection operation configuration program 210 provides to the network administrator a screen for configuring operations, and saves operational definitions designated by the network administrator in a falsification detection configuration file 220.

The falsification detection program 230 executes the falsification detection in accordance with the definitions in the falsification detection configuration file 220. The falsification detection program 230 has a 3-tier structure composed of a falsification detection processing control portion 231, a falsification detection engine portion 232 and an IO control portion 233, in order from the top as shown in FIG. 3.

The falsification detection processing control portion 231 executes the function which detects the appropriate alteration in the content source data 250 and reflects the appropriate alteration in the MD history database 240 and in the published content 320 (the appropriate alteration detection reflection function), and the function which detects the inappropriate alteration (falsification) in the published content 320 and notifies the inappropriate alteration to the administrator's terminal 100 (the inappropriate alteration detection notification function).

The falsification detection engine portion 232 is started from the falsification detection processing control portion 231, and executes a function for generating the message digest and a function for comparing/determining the message digest.

The IO control portion 233 is started from the falsification detection engine portion 232, and provides a function for accessing the content source data 250, a function for carrying out communications with the web site 300 and a function for accessing the database.

Note that the content source data 250 is saved in a local file on the administration site 200 or in a network file system (NFS) on the intranet. In this embodiment, a site for holding the content source data 250 is specifically referred to as a concentrating site. The concentrating site may be the administration site 200, and it may also be at another computer on the intranet.

Further, the administration site 200 has the falsification detection configuration file 220, an operations log database 260 and the MD history database 240. These databases are accessed using the database access function described above.

The web site 300 supporting FTP (File Transfer Protocol) or HTTP (HyperText Transfer Protocol) is connected on a DMZ (DeMilitarized Zone) side of the firewall 510. DMZ refers to a segment prepared by the firewall for protecting an open server, such as the web site 300, from unjustified attacks from the Internet side. DMZ is a concept that was advocated by Check Point Software Technologies, Ltd. of Israel.

The web site 300 has a CPU, a memory, a display, a communications interface and the like. The web site 300 may also be a single computer, and may also be composed of a plurality of computers connected by an intranet or the Internet etc.

On the web site 300, a communications program supporting FTP and HTTP is executed and the published content 320 is published on the Internet. Further, on the web site 300, a variety of agents are executed and information for detecting falsification is notified to the administration site 200.

For example, a published content MD generating agent 310 shown in FIG. 3 is called up by the falsification detection program 230 and replies with the message digest for the designated published content 320.

The published content MD generating agent 310 has hierarchical structure composed of a message digest generating function and the IO control portion. Further, the IO control portion provides a content access control function and a communications control function.

FIG. 4 is a network configuration diagram showing the information processing system. The administration site 200 in an intranet environment 610 is protected from an Internet environment 630 by the firewalls 510 and 520.

An Internet user 400 may access the web site 300 in a DMZ environment 620 through the firewall 520. However, the Internet user 400 cannot access the administration site 200 in the intranet environment 610.

In accordance with the configuration described above, the content source data 250 in the administration site 200 has virtually no chance of being altered inappropriately by the Internet user 400. However, the published content 320 on the web site 300 is accessible by the Internet user 400. Accordingly, it is possible for the published content 320 to be altered inappropriately (falsified) via a security hole in the program.

<System Operating Procedure>

FIG. 5 is a diagram showing an operating configuration of the information processing system.

First, the network administrator displays the falsification detection configuring screen on the administrator's terminal 100 and configures falsification detection conditions (arrow 101). The falsification detection conditions include a location for saving the content source data 250, an area where the MD history database 240 is located, a location for storing the published content 320 to be searched for the falsification detection, a time at which the falsification detection program 230 is to be executed (for example, daily at 0:00:00), and the like. The falsification detection conditions are saved in the falsification detection configuration file 220 (arrow 102).

The content source data 250 is prepared at the content preparation site and sent to the concentrating site at irregular intervals (arrow 103).

The falsification detection program 230 reads out the contents of the falsification detection configuration file 220 (arrow 104, and executes the falsification detection processing according to the contents of the configuration. That is, the falsification detection program 230 generates the message digest from the content source data 250 (arrow 105), reads out the message digest in the MD history database 240 (arrow 106), and compares the two message digests.

Then, in the case where the content source data 250 has been altered, the falsification detection program 230 saves the message digest from the new content source data 250 in the MD history database 240 (arrow 106). Further, the falsification detection program 230 updates the published content 320 by updating its content source data 250 (arrow 109).

Further, the falsification detection program 230 gives a command to an agent of the web site 300 (noted as an MD generating CGI in FIG. 5 and corresponding to the published content MD generating agent 310 in FIG. 3), to make the agent prepare the message digest for the published content 320.

The falsification detection program 230 obtains the message digest of the published content 320, which was made above, from the web site 300 using the HTTP POST method (request command) (arrow 110).

Then, the falsification detection program 230 compares the message digest of the published content 320 with the message digest of the content source data 250 registered in the MD history database 240, and detects the falsification of the published content 320.

Then, in the case where the message digest of the published content 320 does not match the message digest of the latest content source data 250, the falsification detection program 230 then compares the message digest of the published content 320 with the message digest of older source data.

Then, in the case where the message digest of the published content 320 matches a message digest of an older version of the source data, the falsification detection program 230 determines that the disclosure of the content source data 250 has been delayed for some reason (i.e., determines that the alteration is not falsification).

On the other hand, in the case where the message digest of the published content 320 does not match the message digest of any version of the source data, the falsification detection program 230 determines that the published content 320 was falsified. Then, the falsification detection program 230 sends a falsification detection notification to the administrator's terminal 100 by e-mail (arrow 111).

<Operation>

FIG. 6 is a diagram explaining a processing outline for the falsification detection program 230. The administration site 200 executes the falsification detection program 230 (falsification detection processing control portion 231) and provides the function shown in FIG. 6.

First, the falsification detection program 230 executes the initialization processing (SA1). Next, the falsification detection program 230 executes the appropriate alteration detection reflecting processing (SA2). Next, the falsification detection program 230 executes inappropriate alteration detection notification processing (SA3). Thereafter, the falsification detection program 230 ends the falsification detection processing.

FIG. 7 shows details of the initialization processing (SA1 in FIG. 6). In this processing, the falsification detection program 230 first compares the message digest of the content source data 250 with the message digest registered in the MD history database 240, and checks to see if a new file has been added (SB1).

In the case where the new file has been added to the content source data 250, the falsification detection program 230 prepares a message digest from the new file and adds this to the MD history database 240 (SB2). After that, the falsification detection program 230 ends the initialization processing.

FIG. 8 shows details of the appropriate alteration detection reflecting processing (SA2 in FIG. 6). In this processing, the falsification detection program 230 first obtains the file from the content source data 250 and generates the message digest (SC1). The administration site defines the message digest generated at step SC1 as MD(a).

Next, the falsification detection program 230 obtains the latest registered message digest corresponding to the file obtained at step SC1 from the MD history database 240 (SC2). Then, the falsification detection program 230 defines the message digest obtained at step SC2 as MD(b).

Next, the falsification detection program 230 compares the MD(a) and MD(b) (SC3). Then, when the result of the comparison at step SC3 indicates that the two message digests are identical, the falsification detection program 230 judges that the content source data 250 has not been altered and ends the appropriate alteration detection reflecting processing.

On the other hand, in the case where the result of the comparison at step SC3 indicates that the two message digests are not identical, the falsification detection program 230 adds the MD(a) to the MD history database 240 (SC4). Then, the falsification detection program 230 publishes the file in question as the published content 320. (SC5).

Next, the falsification detection program 230 determines whether the file was published successfully or not (SC6). In the case where the publishing was a success, the falsification detection program 230 records the success in a publish log (SC7). Thereafter, the falsification detection program 230 ends the appropriate alteration detection reflecting processing.

On the other hand, in the case where the publishing of the file was a failure, the falsification detection program 230 records the failure in a publish error log (SC8). After that, the falsification detection program 230 ends the appropriate alteration detection reflecting processing.

FIG. 9 shows details of the inappropriate alteration detection notification processing (SA3 in FIG. 6). In this processing, the falsification detection program 230 first generates a message digest of the file from the published content 320 (SD1). The falsification detection program 230 defines the message digest generated at step SD1 as MD(c).

Next, from the MD history database 240, the falsification detection program 230 obtains the latest message digest prepared from the file used to generate the message digest at step SD1 (SD2). Then, the falsification detection program 230 defines the message digest obtained at step SD2 as MD(d).

Next, the falsification detection program 230 compares the MD(c) and MD(d) (SD3). Then, in the case where the result of the comparison at SD3 indicates that the two message digests are the same, the falsification detection program 230 determines that the published content 320 was not altered. Then, the falsification detection program 230 ends the inappropriate alteration detection notification processing.

On the other hand, in the case where the result of the comparison at step SD3 indicates that the two message digests are not identical, the falsification detection program 230 checks whether there is another history of the message digest in the MD history database 240 (SD4).

In the case where there was no history of the message digest at step SD4, the falsification detection program 230 judges that the published content 320 was inappropriately altered, and sends falsification detection notification (SD7). After that, the falsification detection program 230 ends the inappropriate alteration detection notification processing.

Further, in the case where another history of the message digest remains in the MD history database at step SD4, the falsification detection program 230 then obtains the new message digest next to the message digest obtained at step SD2 (SD5). Then, the falsification detection program 230 defines the message digest obtained at step SD5 as MD(e).

Next, the falsification detection program 230 compares the MD(c) and MD(e) (SD6). If the result of the comparison at step SD6 indicates that the two message digests are identical, then the falsification detection program 230 judges that the publishing of the content source data 250 as the published content 320 failed for some reason, and that the published content 320 is in an outdated state. Then, the falsification detection program 230 ends the inappropriate alteration detection notification processing at that point.

Further, if the result of the comparison at step SD6 indicates that the message digests are not identical, then the falsification detection program 230 returns controls to step SD4 and repeats the comparison until the history of the message digest of the file has gone through the entire history.

As described above, the information processing system can distinguish between the appropriate alteration and the inappropriate alteration of the published content 320 that is subject to the falsification detection, and can notify the network administrator of the inappropriate alterations (falsifications) with the appropriate alterations excluded therefrom.

<<Second Embodiment>>

Figure 10:
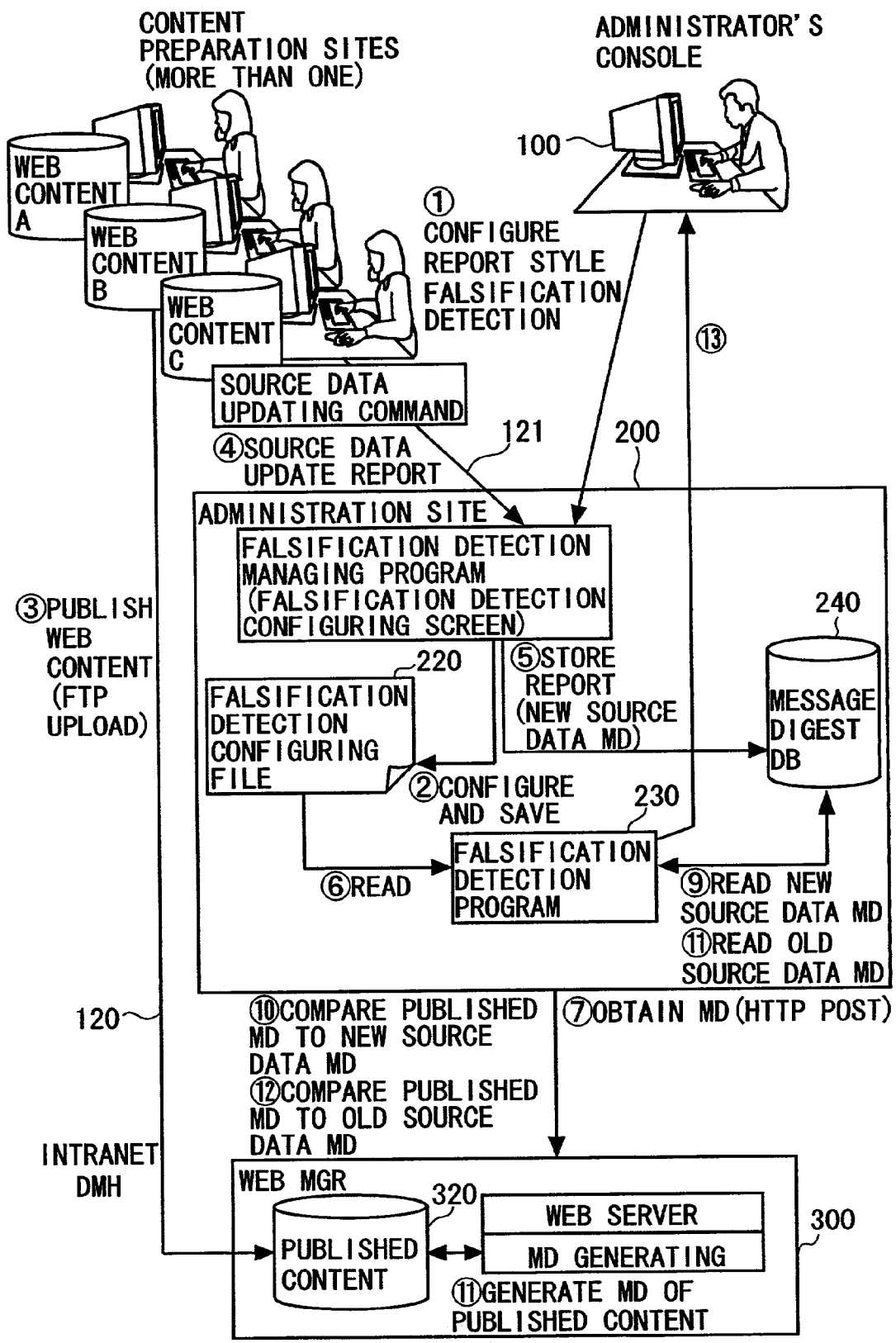
FIG. 10 is a diagram showing an operating configuration of an information processing system in accordance with a second embodiment.
Figure 11:
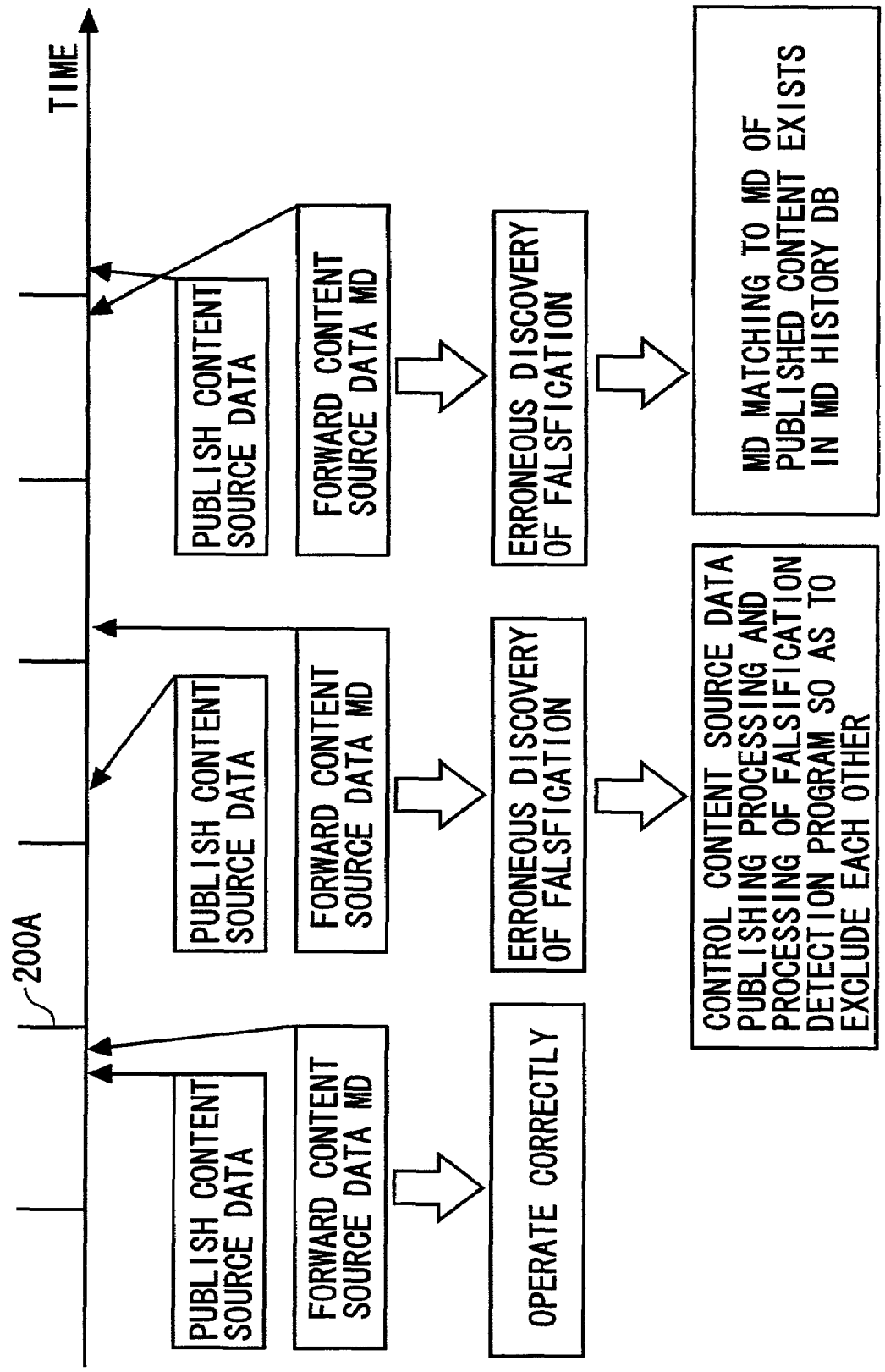
FIG. 11 is a time chart showing timing of an execute cycle of the falsification detection program, processing for publishing content source data and processing of forwarding an MD of the content.
Figure 12:
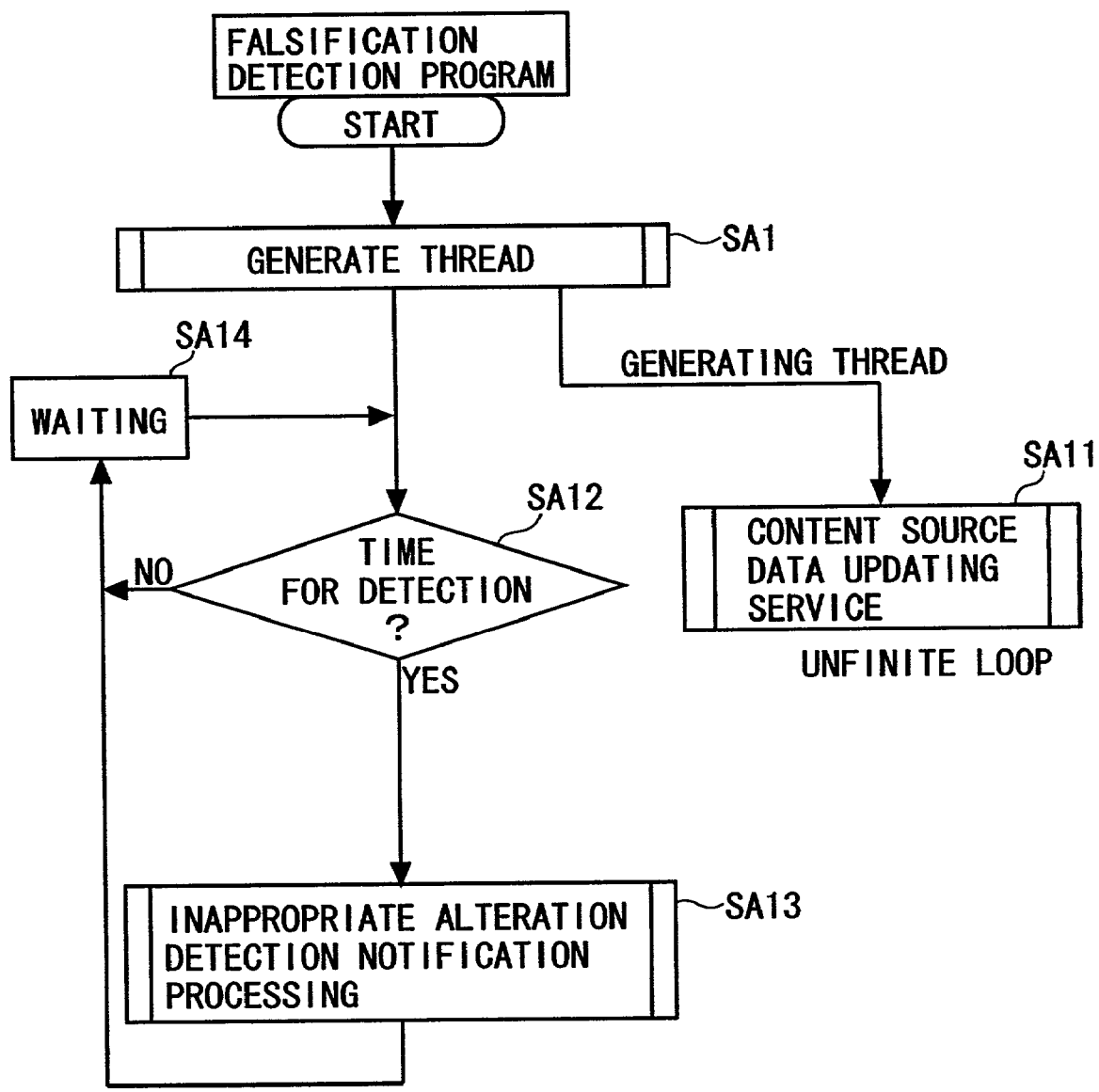
FIG. 12 is a flow chart showing processing of the falsification detection program.
Figure 13:
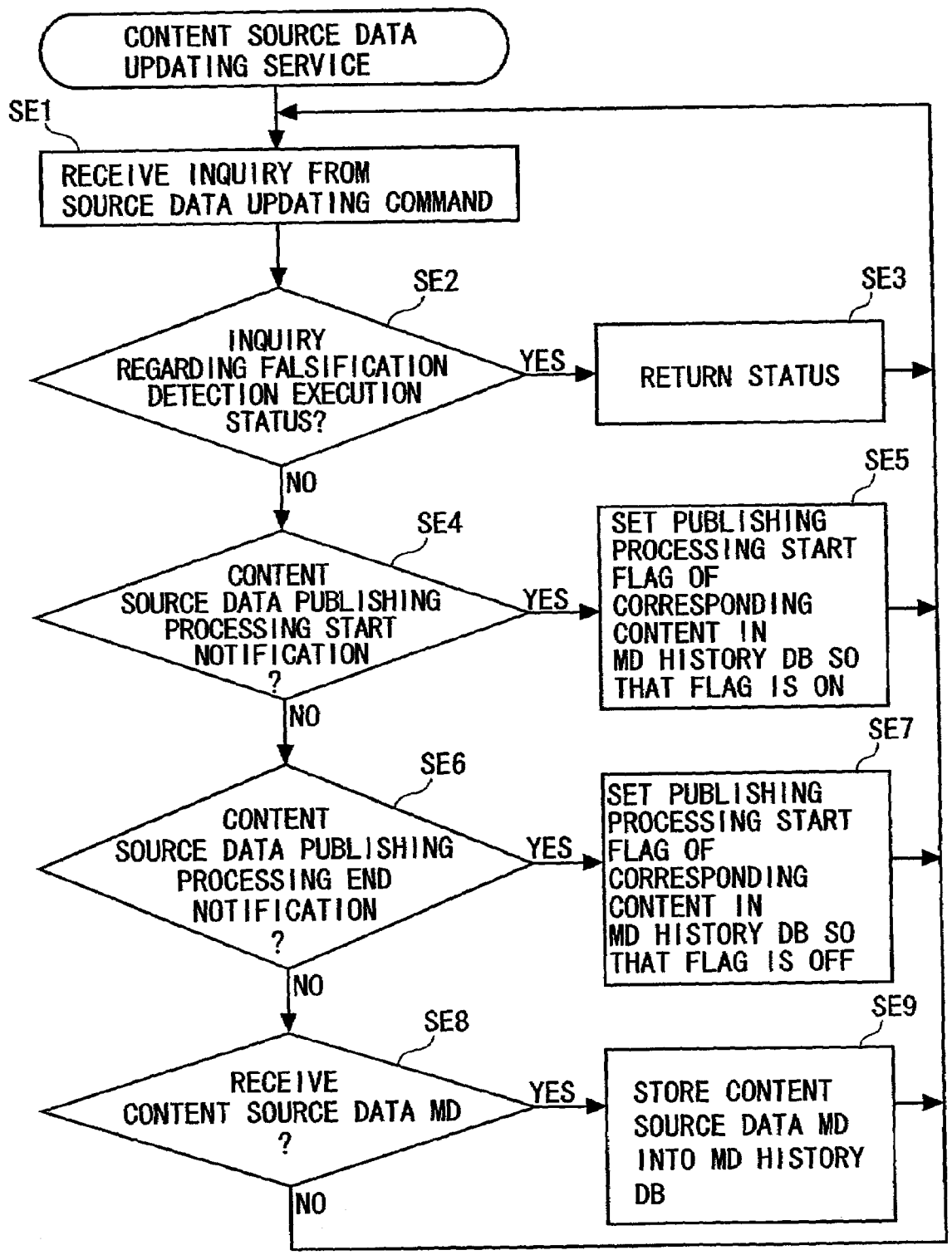
FIG. 13 is a flow chart showing a content source data updating service.
Figure 14:
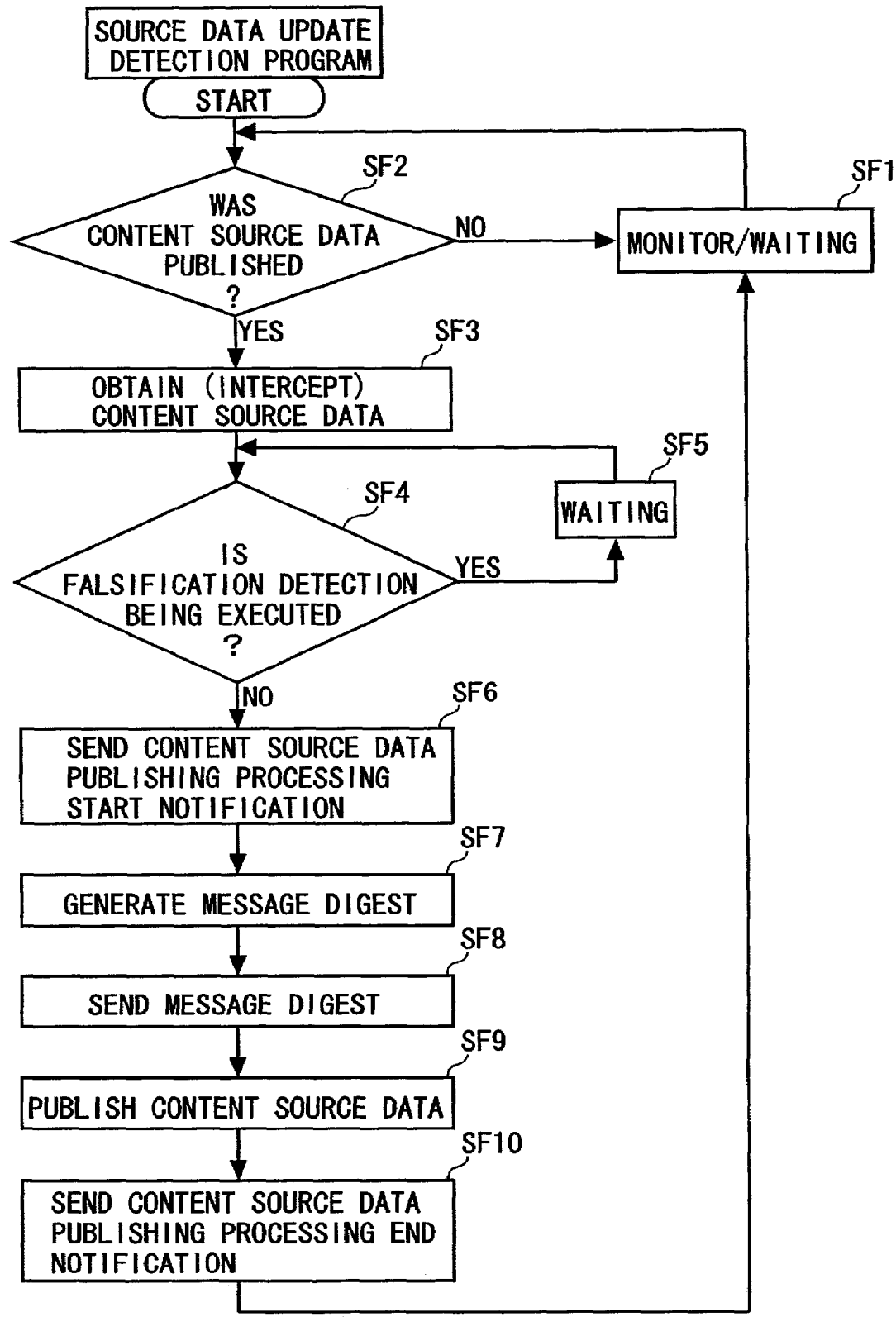
FIG. 14 is a flow chart showing processing of a source data update detection program.
Figure 15:
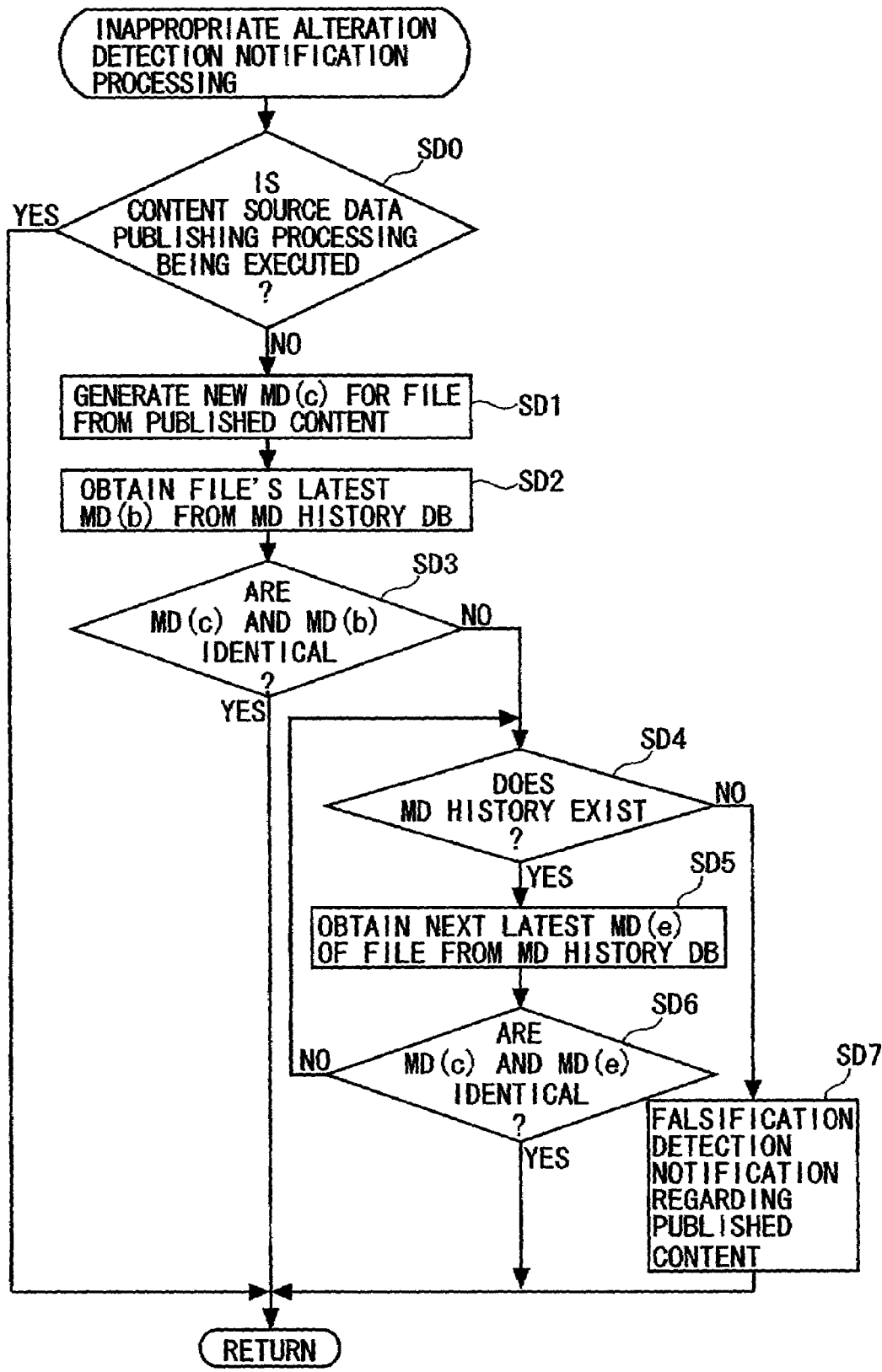
FIG. 15 is a flow chart showing inappropriate alteration detection notification processing.

Hereinafter, an information processing system in accordance with a second embodiment of the present invention is explained with reference to FIG. 10 through FIG. 15. FIG. 10 is a diagram showing an operating configuration of the information processing system; FIG. 11 is a time chart showing timing of an execute cycle of the falsification detection program 230, processing of publishing content source data and processing of forwarding an MD of the content; FIG. 12 is a flow chart showing processing of the falsification detection program 230 of this embodiment; FIG. 13 is a flow chart showing a content source data updating service; FIG. 14 is a flow chart showing processing of a source data update detection program; and FIG. 15 is a flowchart showing inappropriate alteration detection notification processing.

In the first embodiment, the content source data 250 is accumulated in the concentrating site. Therefore, the falsification detection program 230 (falsification detection processing control portion 231) determines whether or not the content source data 250 at the concentrating site was updated, to thereby determine whether or not the content source data 250 should be published.

In accordance with the information processing system of this embodiment, the published content of the web site 300 is updated directly, without the content preparation site going through the concentrating site. Other constructions and operations of the information processing system are similar to those of the first embodiment. Here, the same constitutive elements are indicated by the same reference numerals, and explanations thereof are abbreviated.

<Operating Procedure>

FIG. 10 shows an operating configuration of the information processing system. In the information processing system, a falsification detection managing program provides the falsification detection configuring screen to the administrator's terminal 100.

Further, in the information processing system, the content prepared at the content preparation site is published directly on the web site 300 without going through the concentrating site (arrow 120).

A source data updating command detects this publishing processing and sends a source data updating report (a message digest) to the falsification detection managing program of the administration site 200 (arrow 121). The falsification detection managing program stores the source data update report (the message digest) received into the MD history database 240.

On the other hand, the falsification detection program 230 obtains the message digest of the published content 320 from an agent of the web site 300 at a predetermined time, thus monitoring falsification of the published content 320.

As described above, in the information processing system, the publishing of the content and the registering of the message digest of the content source data 250 into the MD history database 240, and the detection of falsification in the published content 320, are carried out asynchronously.

FIG. 11 is a timing chart showing a timing relationship of the execute cycle of the falsification detection program 230, the processing of publishing the content source data, and the processing of forwarding the content source data 250 message digest.

In the information processing system, the execute cycle of the falsification detection program 230, the processing of publishing the content source data and the forwarding of the content source data 250 message digest are carried out asynchronously, which produces the execution timing relationships shown in FIG. 11.

In FIG. 11, a line 200A on the time axis shows the execute cycle of the falsification detection program 230. For example, if the content source data publishing processing and the processing of forwarding the content source data 250 message digest to the MD history database 240 finish after the execution of the falsification detection program 230 and before the next execution, then the falsification detection program 230 operates correctly.

On the other hand, after the execution of the content source data publishing processing, if the processing of the falsification detection program 230 starts before the processing of forwarding the content source data 250 message digest to the MD history database 240 ends, then the message digests of the published content 320 and the MD history database 240 will not match each other and it will be determined that there is a falsification (this is a malfunction).

In order to avoid the malfunction described above, it is sufficient to control so that the processing of the falsification detection program 230 does not start during the interval after the execution of the content source data publishing processing until the completion of the processing of forwarding the content source data 250 message digest.

Further, for example, when the content source data 250 message digest is forwarded to the MD history database 240, and the falsification detection program 230 processing starts before the content source data 250 is published, the message digest of the published content 320 and the message digest of the MD history database 240 will not match each other. However, this is the same as in the first embodiment in the case where there was a delay in publishing the content source data 250 as the published content 320.

That is, the message digest of the published content 320 matches one of the message digests in the MD history database 240. Therefore, an erroneous falsification report will not be made provided that the confirmation of the message digests in the MD history database 240 is made.

<Operation>

FIG. 12 shows processing of the falsification detection program 230 executed at the administration site 200.

In this processing, the falsification detection program 230 first executes the initialization processing (SA1). At this time, the falsification detection program 230 generates a thread and starts content source data updating service (SA11). Subsequently, the content source data updating service is executed asynchronously with the falsification detection program 230 in an infinitely repeating loop.

Next, the falsification detection program 230 determines whether or not it is time to perform the detection (SA12). In the case where it is not yet time, the falsification detection program 230 waits for the detection time (SA14).

In the determination at SA11, in the case where it is the detection time, the falsification detection program 230 executes the inappropriate alteration detection notification processing (SA13). Then, the falsification detection program 230 waits for another detection time (SA14).

FIG. 13 shows processing of the content source data updating service. As described above, the content source data updating service is carried out independently as a thread. Normally, the content source data updating service is in a state of waiting for receiving an inquiry from the source data updating command (SE1). Here, the source data updating command refers to a program which is executed at the content preparation site and which monitors the publishing of the content source data 250, as shown in FIG. 10.

When the content source data updating service receives the inquiry, it determines whether or not the inquiry is an inquiry about the execution status of the falsification detection (SE2). Then, in the case where the inquiry is the inquiry about the falsification detection execution status, the content source data updating service sends (returns) the current falsification detection execution status to the source data updating command (SE3). Thereafter, the content source data updating service returns the controls to step SE1.

Further, in the case where the inquiry is not the inquiry about the falsification detection execution status, the content source data updating service determines whether or not the inquiry is a notification notifying that the processing of publishing the content source data 250 has started (SE4). Then, in the case where the inquiry is this content source data 250 publishing processing start notification, the content source data updating service sets a publishing processing start flag, which is linked to the MD history database 240, so that the flag is on (SE5). Thereafter, the content source data updating service returns the controls to step SE1.

Further, in the case where the inquiry is not the content source data 250 publishing processing start notification, the content source data updating service determines whether or not the inquiry is a notification notifying that the processing of publishing the content source data 250 has ended (SE6). Then, in the case where the inquiry is this content source data 250 publishing processing end notification, the content source data updating service sets the publishing processing start flag, which is linked to the MD history database 240, so that the flag is off (SE7). After that, the content source data updating service returns the controls to step SE1.

Further, in the case where the inquiry is not the content source data 250 publishing processing end notification, the content source data updating service determines whether or not the inquiry is a request to receive the message digest of the content source data 250 (SE8). Then, in the case where the inquiry was this content source data 250 message digest reception request, the content source data updating service stores the message digest into the MD history database 240 (SE9). After that, the content source data updating service returns the controls to step SE1.

FIG. 14 shows processing of a source data update detection program (source data updating command) which is executed by the content preparation site. Normally, the source data update detection program monitors whether or not the content source data 250 has been published (SF1). This is achieved by the source data update detection program monitoring the updating processing that is performed using FTP. Further, the source data update detection program itself may be started within the command that starts processing of uploading the content source data 250 to the web site 300.

Then, when the content source data 250 is published (YES at step SF2), the source data update detection program obtains the content source data 250 (SF3). This processing obtains the content source data 250 before it is forwarded to the web site 300 by FTP.

Next, the source data update detection program sends an inquiry to the falsification detection program 230 at the administration site 200 to determine whether or not falsification detection is currently being executed (SF4). Then, in the case where the falsification detection is currently being executed, the source data update detection program waits for the end of the falsification detection (SF5).

On the other hand, in the case where the falsification detection is not currently being executed, the source data update detection program sends the content source data 250 publishing processing start notification (SF6). Next, the source data update detection program generates the message digest from the content source data 250 (SF7).

Next, the source data update detection program sends this message digest to the administration site 200 (SF8). Next, the source data update detection program publishes the content source data 250 (SF9).

Then, the source data update detection program sends the content source data 250 publishing processing end notification (SF10). After that, the source data update detection program returns the controls to step SF1.

FIG. 15 shows details of the inappropriate alteration detection notification processing of the falsification detection program 230 (SA13 in FIG. 12). In this processing, the falsification detection program 230 first refers the publishing processing start flag (set at step SE5 in FIG. 13), and determines whether or not processing of publishing the content source data 250 is currently being executed (SD0).

Then, in the case where the content source data 250 publishing processing is currently being executed, the falsification detection program 230 ends the inappropriate alteration detection notification processing. Further, in the case where the content source data 250 publishing processing is not currently being executed, the processing to be executed (step SD1 through step SD7) is the same as in FIG. 9 of the first embodiment.

As described above, in accordance with the information processing system, even when the content preparation site updates the published content 320 on the web site 300 in an asynchronous fashion, events occurring at the time of updating—for example, the FTP transmission of the content source data 250, and execution of the command to start the processing of uploading the source data to the web site 300—are detected whereby the message digest created from the content source data 250 can be registered into the MD history database 240 as needed.

In the above case, it is sufficient that, the publishing processing start flag is set, during the publishing of the content source data 250 and the execution of the processing of registering the content source data 250 message digest into the MD history database 240, and that the falsification detection program 230 is made not to execute the inappropriate alteration detection notification processing.

Further, in the case where the falsification detection program 230 is currently being executed, it is sufficient that the publishing of the content source data 250 and the processing of registering the message digest of the content source data 250 into the MD history database 240, which are performed by the content source data update detection program, are made to wait.

By establishing synchronization as described above, it becomes possible to prevent the determination in which the appropriate alteration is regarded as the falsification.

<<Computer Readable Storage Medium>>

A program for making a computer realize any of functions of the above information processing system may be recorded on a computer readable storage medium. Then, by making the computer read and execute the program on the storage medium, it is possible to make the computer realize any of functions of the above information processing system.

Here, the computer readable storage medium refers to a storage medium which can store information such as data and a program by means of an electrical, magnetic, optical, mechanical or chemical action and read the information from the computer. Examples of the storage medium described above which are also removable from the computer, include a floppy disk, a magneto optical disk, a CD-ROM, a CD-R/W, a DVD, a DAT, an 8-mm tape and the like.

Further, the storage media fixed in the computer include a hard disk, a ROM (Read Only Memory) and the like.

<<Data Communications Signal Embodied by a Carrier Wave>>

Further, the above program may be stored in the hard disk or memory of the computer and distributed to another computer via a communications medium. In this case, the program is sent through the communications medium as a data communications signal embodied by a carrier wave. Then, any of functions of the information processing system may be realized on a computer that has received the distribution of the program.

Here, the communications medium may be, for example, a cable-based communications medium such as a metal cable type including a coaxial cable and a twist pair cable or an optical communications cable, or a wireless communications medium such as satellite communications or ground wave wireless communications.

Further, the carrier wave is an electromagnetic wave or light for modulating the data communications signal. However, the carrier wave may also be a direct current signal. In this case, the data communications signal is a baseband waveform without the carrier wave. Therefore, the data communications signal embodied by the carrier wave may be either a modulated broadband signal or an unmodulated baseband signal (equivalent to the case where a 0-voltage direct current signal serves as the carrier wave).

What is claimed is:

1. A falsification detection system comprising:
a first confirmation information preparing unit preparing confirmation information of source data of content before being published on the Internet, the source data being updated at irregular intervals;

a confirmation information holding unit holding the confirmation information of the source data at a predetermined point in time;

a source data alteration detecting unit detecting an appropriate alteration in the source data based on the confirmation information prepared by the first confirmation information preparing unit and the confirmation information held in the confirmation information holding unit;

a reflecting unit reflecting the altered source data in published content on a site published on the Internet and reflecting the confirmation information of the altered source data in the confirmation information holding unit;

a second confirmation information preparing unit preparing confirmation information of the published content;

a published content alteration detecting unit detecting alteration in the published content;

a controlling unit controlling detection of an inappropriate alternation of the published content by a third party, based on the confirmation information held in the confirmation information holding unit and the confirmation information prepared by the second confirmation information preparing unit; and a published content alteration notifying unit notifying a predetermined terminal of information relating to the altered published content detected by the controlling unit.

2. A falsification detection system according to claim 1, wherein the controlling unit obtains the confirmation information of the altered published content from the second confirmation information preparing unit, and detects the altered published content, excluding the published content of which the confirmation information of the published content matches any of the confirmation information held in the confirmation information holding unit.

3. A falsification detection system according to claim 1, wherein the controlling unit, when detecting an alteration in the source data, controls to reflect the confirmation information of the altered source data in the confirmation information holding unit and to reflect the altered source data in the published content.

4. A falsification detection system according to claim 1, wherein the confirmation information holding unit holds history of the confirmation information of the source data.

5. A falsification detection system according to claim 1, wherein the published content subject to the falsification detection is the published content on a web site on the Internet.

6. A falsification detection system according to claim 1, wherein the published content subject to the falsification detection has a one vs. many operation configuration, in which the falsification detection is possible on a plurality of published content on a plurality of web sites from a single administration site.

7. A falsification detection system according to claim 1, wherein the system comprises an active content generating program (CGI) as the published content subject to the falsification detection.

8. A falsification detection system according to claim 1, wherein the published content is provided on a web site supporting FTP (File Transfer Protocol) and HTTP (Hyper-Text Transfer Protocol).

9. A falsification detection method comprising the steps of:

a first preparing step of preparing confirmation information of source data of content before being published on the Internet, the source data being updated at irregular intervals;

a recording step of recording the confirmation information of the source data in a confirmation information holding unit at a predetermined point in time;

a detecting step of detecting an appropriate alteration in the source data based on the confirmation information prepared by the first preparing step and the confirmation information recorded in the confirmation information holding unit;

a reflecting step of reflecting the altered source data in the published content on a site published on the Internet and reflecting the confirmation information of the altered source data in the confirmation information holding unit;

a second preparing step of preparing confirmation information of the published content;

a detecting step of detecting an alteration in the published content;

a controlling step of controlling detection of inappropriate alternation of the published content by a third party, based on the confirmation information recorded in the confirmation information holding unit and on the confirmation information prepared by the second preparing step; and a notifying step of notifying a predetermined terminal of information relating to the altered published content detected.

10. A falsification detection method according to claim 9, further comprising
obtaining the confirmation information of the altered published content, wherein detecting the alternation in the published content includes excluding the published content of which the confirmation information matches any of the confirmation information recorded in the confirmation information holding unit.

11. A falsification detection method according to claim 9, further comprising:
controlling, when detecting an alteration in the source data, to reflect the confirmation information of the altered source data in the confirmation information holding unit and to reflect the altered source data in the published content.

12. A falsification detection method according to claim 9, wherein history of the confirmation information of the source data is recorded.

13. A falsification detection method according to claim 9, wherein the published content subject to the falsification detection is the published content on a web site on the Internet.

14. A computer readable storage medium recorded with a program executed by a computer to detect a falsification, the program comprising the steps of:

a first preparing step of preparing confirmation information of source data of content before being published on the Internet, the source data being updated at irregular intervals;

a recording step of recording the confirmation information of the source data in a confirmation information holding unit at a predetermined point in time;

a detecting step of detecting an appropriate alteration in the source data based on the confirmation information prepared by the first preparing step and the confirmation information recorded in the confirmation information holding unit;

a reflecting step of reflecting the altered source data in the published content on a site published on the Internet and reflecting the confirmation information of the altered source data in the confirmation information holding unit;

a second preparing step of preparing confirmation information of the published content;

a detecting step of detecting an alteration in the published content;

a controlling step of controlling detection of inappropriate alternation of the published content by a third party, based on the confirmation information recorded in the confirmation information holding unit and on the confirmation information prepared by the second preparing step; and a notifying step of notifying a predetermined terminal of information relating to the altered published content detected.

15. A computer readable storage medium recorded with a program according to claim 14, further comprising obtaining the confirmation information of the altered published content, wherein the detecting the alternation in the published content involves excluding the published content of which the confirmation information matches any of the confirmation information recorded in the confirmation information holding unit.

16. A computer readable storage medium recorded with a program according to claim 14, further comprising:

controlling, when detecting an alteration in the source data, to reflect the confirmation information of the altered source data in the confirmation information holding unit and to reflect the altered source data in the published content.

17. A computer readable storage medium recorded with a program according to claim 14, wherein in the recording, history of the confirmation information of the source data is recorded.

18. A computer readable storage medium recorded with a program according to claim 14, wherein the published content subject to the falsification detection is the published content on a web site on the Internet.

* * * * *